United States Patent [19]
Polidori, Sr. et al.

[11] 3,785,348
[45] Jan. 15, 1974

[54] AUTOMATIC PET FEEDER

[76] Inventors: Stanley J. Polidori, Sr.; Rockney A. Tope, both of P.O. Box 957, Holdersen, Nev. 89015

[22] Filed: Sept. 20, 1972

[21] Appl. No.: 290,585

[52] U.S. Cl. .................................. 119/62, 119/1
[51] Int. Cl. ............................................ A01k 05/00
[58] Field of Search .................... 119/62, 54, 51.12

[56] References Cited
UNITED STATES PATENTS
3,121,419 2/1964 Gillespie ............................. 119/62
3,176,656 4/1965 Bates .................................... 119/62
2,814,271 11/1957 Black ................................. 119/62 X

*Primary Examiner*—Hugh R. Chamblee
*Attorney*—John W. Kraft

[57] ABSTRACT

The automatic pet feeder comprises a base; a dish assembly having a dish-retaining body, dishes operable to be retained in the body, and a hingedly mounted lid; and a lid-actuating assembly having hinge drive means operable to raise and lower the lid away from the dishes, body, and control means to selectively activate the lid-actuating drive means.

7 Claims, 6 Drawing Figures

PATENTED JAN 15 1974   3,785,348

AUTOMATIC PET FEEDER

FIELD OF INVENTION

The present invention relates to animal feeders and pet containers, and more particularly to animal feeders and pet containers having mechanically actuated lids.

DESCRIPTION OF THE PRIOR ART

In practice it has been found that animal food may decay in a feeding container between animal feeding periods. To reduce such loss, small portions of food may be provided at predetermined feeding intervals, or the food remaining after the feeding period may be covered. With some species, however, the predetermined feeding periods, or the removal of food for storage, may inhibit the animal's behavior. It has also been found that food suitable for some species may be objectionable in sight or oder to humans. It has also been found that certain animals kept at close quarters with humans may entail problems in collection and removal of excrement.

Accordingly, it is an object of this invention to provide animal food containers having mechanically actuated lids which may be raised and lowered in response to behavior of the animal.

It is an object of this invention that mechanical lid-acutating means include compact electrical drive means.

Another object of this invention is to provide lid-actuating means for the litter box which may be actuated by behavior of the animal and by compact electrical drive means.

It is an object of this invention to provide a litter container removable from the mechanical apparatus of this invention.

These and other objects shall become apparent from the description following, it being understood that modifications may be made without affecting the teachings of the invention here set out.

SUMMARY OF THE INVENTION

Generally, the automatic pet feeder comprises a base; a dish assembly having a dish-retaining body, dishes operable to be retained in the body, and a hingedly mounted lid; and a lid-actuating assembly having hinge drive means operable to raise and lower the lid away from the dishes, body, and control means to selectively activate the lid-actuating drive means. A further embodiment includes a litter box having a base; a box assembly having a body, a box container, and a lid; and a lid-actuating assembly including means to selectively raise and lower the lid.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
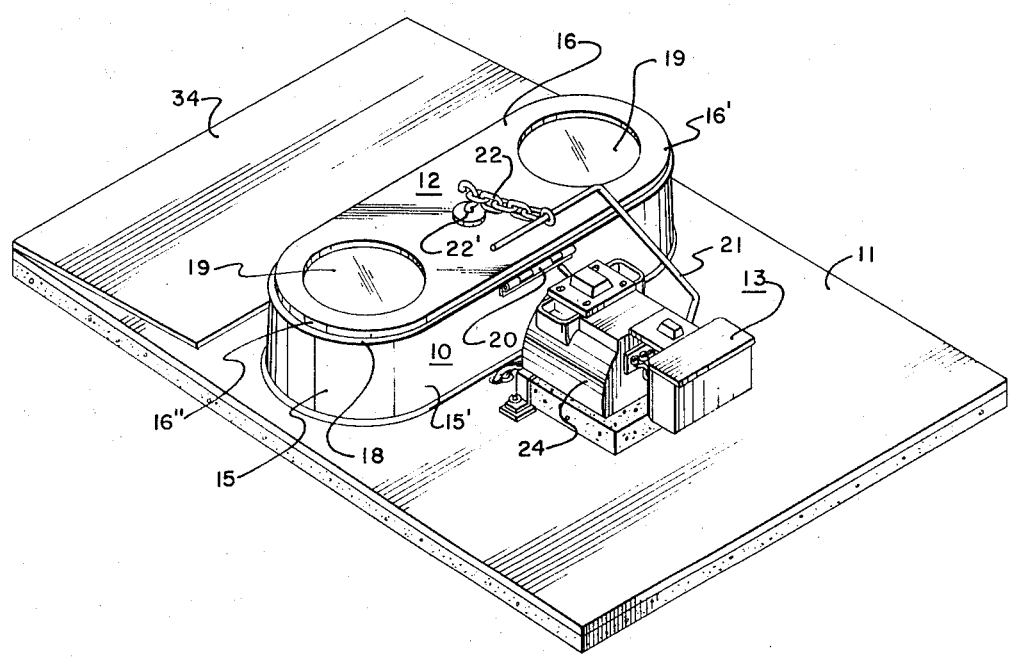
FIG. 1 is a right rear perspective view of the automatic pet feeder of this invention.
Figure 2:
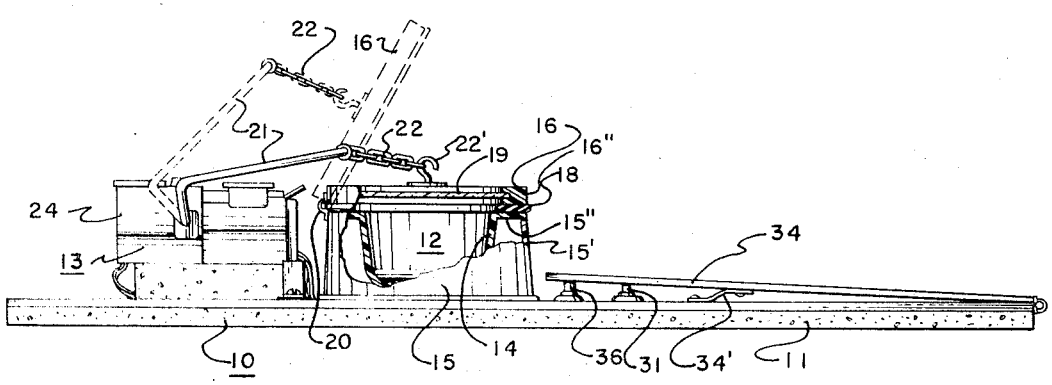
FIG. 2 is a side elevational view of the apparatus of the FIG. 1 including a portion of the side wall of the dish cover broken away to show the interior configuration of the feeding dish assembly, and including the lid shown in the open position in broken lines for illustrative purposes.

Referring now to the drawings and more particularly to the FIGS. 1 and 2, the automatic pet feeder of this invention is shown to advantage and generally identified by the numeral 10. The automatic pet feeder 10 comprises a base 11, a dish assembly 12, and a lid-actuating assembly 13. The base 11 may be a suitably configured board operable to provide a stable platform for the feeder 10.

The dish assembly 12 is fastened to the uppermost terminal side of the base 11; and comprises food containers 14, a dish-supporting body 15, and a lid 16. Each of the containers 14 is a suitably configured bowl which may be fabricated of molded plastic. The dish-supporting body 15 includes substantially upstanding side walls 15' and a top wall, or projecting lip, 15''. The containers 14 and supporting body 15 may be fabricated as a single molded unit. The food containers 14 may be detachably mounted in the body 15 to facilitate filling and cleaning of the containers 14, and to facilitate cleaning of the feeder 10. The food containers 14 may be demountably, slidably engageable with holes 17 in the top wall 15''; or may be molded together with the top wall 15''. Each food container 14 is provided with an outwardly projecting lip 15'' which is operable to rest on the uppermost terminal side of the side walls'. It is to be understood that though a pair of containers 14 are described a single container may be used with a single hole.

The lid 16 is operable to cover the food containers 14 and to suitably cover the top wall 15''. The lid 16 includes a flat top wall 16' and a rim 16'' disposed about the perimeter of the top wall 16' on the lowermost terminal side. A gasket 18 is provided about the body-contacting surfaces of the lid 16. It has been found to advantage to provide windows 19 in the top wall 16' over each of the food containers 14. The lid is pivotally mounted to the rearwardmost terminal side of the body 15 by means of a hinge 20.

Figure 3:
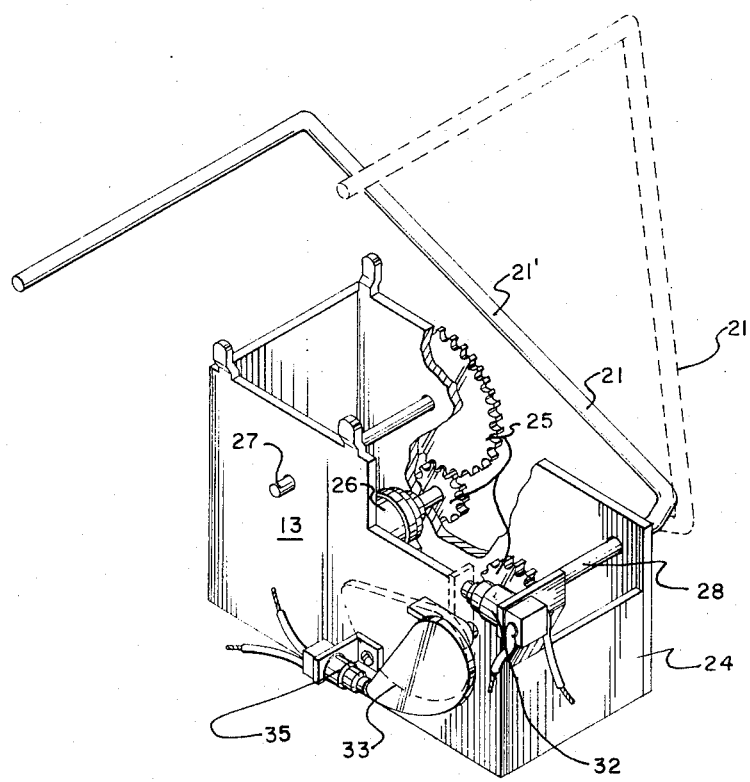
FIG. 3 is a right rear perspective view of the drive assembly of this invention.
Figure 4:
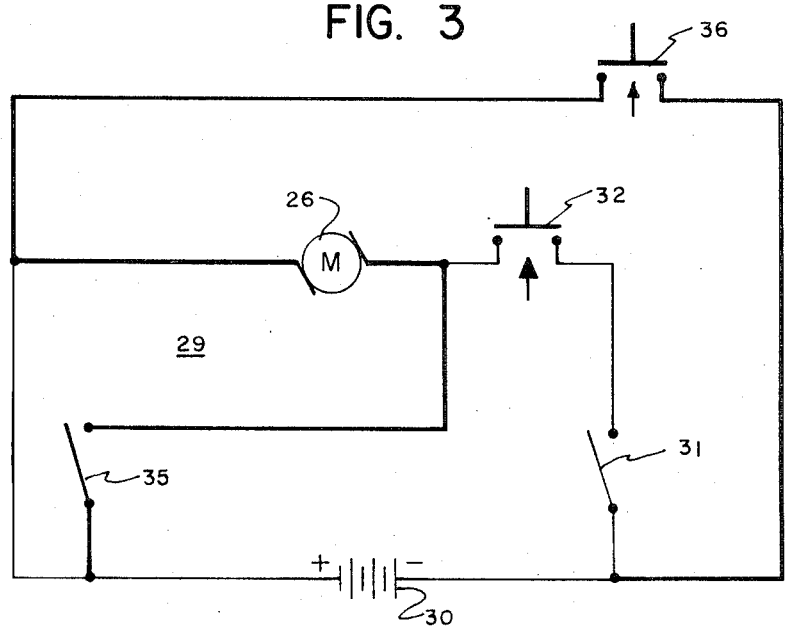
FIG. 4 is a schematic diagram of the electric control subassembly of this invention.

The lid 16 is raised and lowered by the lid-actuating assembly 13. The lid actuating assembly 13 includes a suitably driven arm 21. The arm 21 is pivotally mounted at one of its terminal ends by means of a linkage 22 to a capstan 22' disposed in the uppermost terminal side of the lid 16. The lid-actuating assembly 13 is fastened to the uppermost terminal side of the base 11 rearwardly of the dish assembly 12. Referring now to the FIG. 3, the lid-actuating assembly 13 is mounted in a suitable housing 24, and includes a gear train 25 and a suitable driving means, such as a motor 26. The gear train 25 is intended to reduce the work required by the arm 21. The arm 21 includes a rectilinearly disposed lifting portion 21' and a transversely disposed axle portion 28. The gears of the gear train 25 are mounted on a suitable shaft means 27, and the axle portion 28 of the arm 21 is disposed transversely in the housing 24. Referring to the FIG. 4, the actuator assembly 13 is controlled by a control subassembly 29. The control subassembly 29 may be conveniently divided into a lid-opening function and a lid-closing function. In the opening function, one lead from a suitable power source 30, such as a battery, includes a contact switch 31 and a reverse push-button 32. The reverse push-button switch 32 is mounted on the housing 24, and is operable to make contact when its plunger portion is free and to break contact when the plunger is depressed. The opposing lead from the power source 30 is connected to the motor 26. As shown in the FIG. 3, the axle portion 28 of the arm 21 is provided with a cam 33. As shown in the FIG. 2, a push-button-like switch 31 is disposed below a platform 34 on the upper terminal side of the base 11. When the platform 34 is depressed, the switch 31 is operable to make contact and to close the lid-opening function circuit of the control subassembly 29; thus activating the motor 26 and rotating the axle 28 and the cam 33 by means of the drive train 25. The motor 26 is stopped when the leading edge of the cam 33 contacts the plunger of the reverse push-button 32. The lid-closing function includes one lead from the power source 30 having a switch 35 which may be a push-button and the opening lead from the power source 30 having a reverse push-button 36. The switch 35 may be in the same lead side of the power source 30 as the switches 31 and 32 of the lid-opening function. The push-button switch 35 is mounted distally from the reverse travel of the cam 33 on the housing 24, as shown in the FIG. 3. As shown in the FIG. 2, the reverse push-button 36 of the lid-closing function is disposed beneath the platform 34. In the lid-closing function, when the platform 34 has been released and the urging means 34' disposed between the base 11 and the platform 34 has urged the platform 34 upwardly, the reverse push-button 36 is operable to make contact and to close the lid-closing function circuit. The cam 33 is driven by the motor 26 in an opposite direction of rotation. When the leading edge of the cam 33 releases the push-button 35, the lid-closing circuit is open.

In operation, an animal may stand upon the platform 34, thus activating the lid-opening function of the control subassembly 29, thus opening the lid 16 as set out above. The animal may eat freely from the food containers 14 until it has withdrawn from the platform 34. When it has withdrawn from the platform 34, the lid-closing function of the control subassembly 29 is operable to drive the arm 21 downwardly; thus closing the lid 16.

Figure 5:
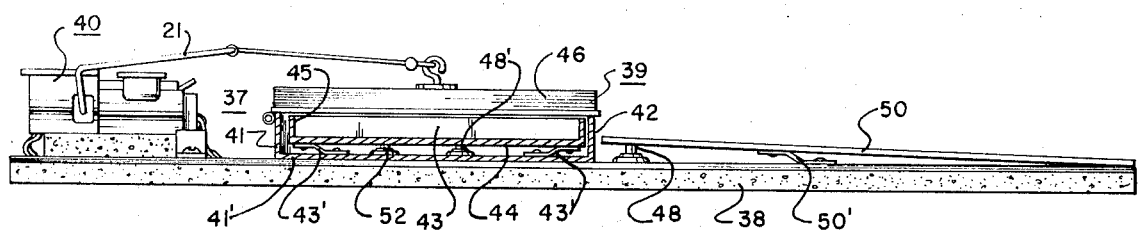
FIG. 5 is a side elevational view of the automatic litter box of the further embodiment of this invention shown with one of its exterior walls removed for illustrative purposes.

Referring to the FIG. 5, a further embodiment of this invention is utilized as a litter box 37. The litter box 37 comprises a base 38, a box assembly 39, and a lid-actuating assembly 40. The base 38 is of a type similar to the base 11. The box assembly 39 includes a body 41 having a bottom wall 41' and substantially upstanding side walls 42 and a litter container 43. The litter container 43 comprises a bottom wall 44 and upstanding side walls 45, and is proportionally configured to slidably engage the side walls 42 of the body 41. In a manner similar to the feeder 10, the litter box 37 includes a lid 46 which is driven by a lid-actuating assembly 40.

Figure 6:
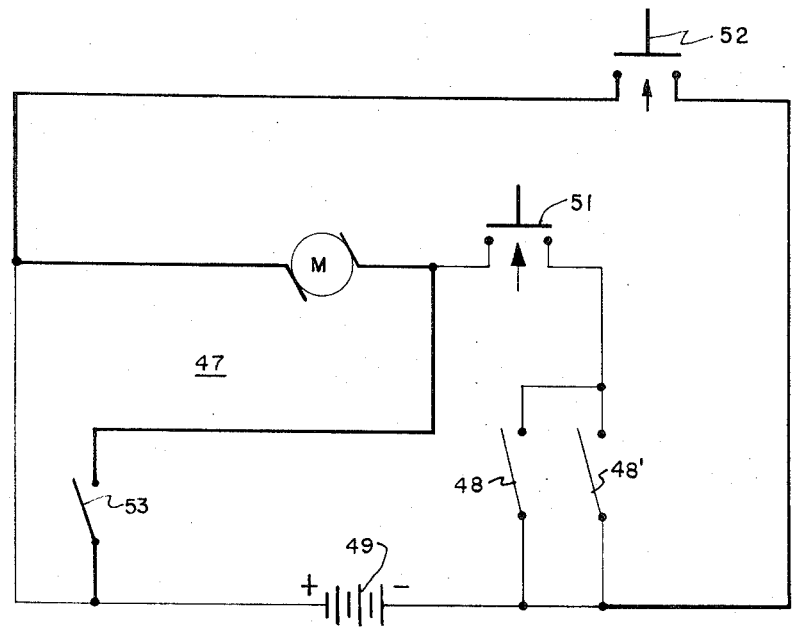
FIG. 6 is a schematic diagram of the electric control subassembly of the further embodiment.

As shown in the FIGS. 5 and 6, the lid-actuating assembly 40 is similar to the lid-actuating assembly 13 of the animal feeder 10. The lid-actuating assembly 40 is controlled by a control subassembly 47. In a manner similar to the control subassembly 29 of the animal feeder 10, the control subassembly 47 may be conveniently divided into a lid-opening function and a lid-closing function. The lid-opening function is controlled by a pair of switches 48 and 48' in one lead of a power source 49, similar in function to the switches 31 and 32 of the control subassembly 29. As shown in the FIG. 5, the switch 48 is disposed between the platform 50 and the uppermost terminal side of the base 38 in a manner similar to the switch 31 of the feeder 10. The switch 48' is disposed between the bottom wall 44 and the uppermost terminal side of the bottom wall 41' of the body 41. An urging means 50' is disposed between the base 38 and the platform 50 in a manner similar to the urging means 34' of the feeder 10. In operation, when the animal stands upon the platform 50, the switch 48 is depressed and the lid 46 is activated in a manner similar to the operation of the animal feeder 10. When the lid 46 is sufficiently opened by contact of a reverse push-button 51, similar to the button 32 set out above, the animal may enter the container 43, thus depressing the switch 48'. As shown in the FIG. 6, the lid-closing circuit function is substantially similar to the lid-closing circuit of the feeder 10. In the body 41 the lid-closing function includes a reverse push button switch 52 which is disposed between the bottom wall 44 of the container 43 and the body 41, similar in function to the reverse button 36 set out above, and a push-button 53, similar to the push-button 35 previously described. In operation, when the animal leaves the container 43, an urging means 43', disposed between the litter box 43 and the body 41, urges the container 43 upwardly, thus activating the reverse push-button switch 52 and resulting in the activation of the lid-closing circuit.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

We claim:

1. An automatic pet feeder comprising
   a base having a movable, depressible platform, said base including means urging said platform upwardly;
   a dish assembly including a dish-supporting body, said body having side walls fastened to said base and a top wall provided at the uppermost edge of said side walls, a food container disposed in a suitable hole in said top wall, and a lid having a flat top wall, said lid is operable to cover said container, said lid being mounted on a hinge at the rearwardmost side of said dish-supporting body; and
   a lid-actuating assembly mounted rearwardly of said dish assembly on said base, said lid-actuating assembly including a gear train, an arm connected to said gear train and to said top wall of said lid, a drive means operable to drive said gear train, a cam suitably mounted on one of the shafts of said gear train, and a control subassembly having a lid-opening function comprising one lead from a suitable power source having a contact switch disposed beneath said platform of said base and a reverse push-button disposed at a predetermined upper travel of said lid-raising arm operable to be contacted by a predetermined upper travel of said cam and an opposing lead con-nected between the opposing lead of said power source to said drive means, and a lid-closing function comprising one lead from said power source including a switch disposed at a predetemined travel of said cam corresponding to the lower lid-closing position of said arm and a reverse push-button disposed beneath said platform.

2. The apparatus of claim 1 including a rim on the dish-supporting body side of said lid and a gasket on the dish-supporting body and food container contacting edge of said rim.

3. The apparatus of claim 1 including a window in said lid.

4. The apparatus of claim 1 wherein said food container is demountably, slidably, engageable with said hole in said dish-supporting body.

5. The apparatus of claim 1 wherein said dish-supporting body and said food containers are molded together.

6. The apparatus of claim 1 wherein said dish assembly includes a pair of food containers and a pair of food container receiving holes in said dish-supporting body.

7. The apparatus of claim 1 including a rim on the dish-supporting body side of said lid and a gasket on the dish-supporting body and food container contacting edge of said rim.

* * * * *